US009753491B2

(12) United States Patent
Tsai et al.

(10) Patent No.: US 9,753,491 B2
(45) Date of Patent: Sep. 5, 2017

(54) DETACHABLE PORTABLE COMPUTING APPARATUS

(71) Applicants: Inventec (Pudong) Technology Corporation, Shanghai (CN); INVENTEC CORPORATION, Taipei (TW)

(72) Inventors: Yi-Ling Tsai, Taipei (TW); Kuo-Yang Cheng, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 7 days.

(21) Appl. No.: 15/152,534

(22) Filed: May 11, 2016

(65) Prior Publication Data
US 2017/0153664 A1    Jun. 1, 2017

(30) Foreign Application Priority Data
Nov. 27, 2015    (CN) .......................... 2015 1 0846714

(51) Int. Cl.
*G06F 1/16*      (2006.01)
*H05K 5/00*     (2006.01)
*H05K 7/00*     (2006.01)
*G06F 3/02*      (2006.01)

(52) U.S. Cl.
CPC .......... *G06F 1/1616* (2013.01); *G06F 1/1654* (2013.01); *G06F 1/1681* (2013.01); *G06F 3/0202* (2013.01)

(58) Field of Classification Search
CPC ..... G06F 1/1616; G06F 1/1654; G06F 1/1632
USPC .......................... 361/679.21, 679.26, 679.3, 361/679.41–679.44, 679.29
See application file for complete search history.

(56) References Cited

U.S. PATENT DOCUMENTS

| 6,937,468 | B2 * | 8/2005 | Lin ....................... G06F 1/1632 361/679.41 |
| 8,953,310 | B2 * | 2/2015 | Smith ...................... G06F 1/16 160/266 |
| 9,167,711 | B2 * | 10/2015 | Lee ........................ G06F 1/1654 |
| 9,367,088 | B2 * | 6/2016 | Chang ................... G06F 1/1632 |
| 2013/0170126 | A1 * | 7/2013 | Lee ........................ G06F 1/1654 361/679.17 |

(Continued)

*Primary Examiner* — Anthony Haughton
(74) *Attorney, Agent, or Firm* — CKC & Partners Co., Ltd.

(57) ABSTRACT

Detachable portable computing apparatus includes a base, a connecting component and a display component. The connecting component includes a housing, a first magnetic unit, and a guide pin. The housing has an opening on the housing. The first magnetic unit locates inside the housing, and moves toward or away from the opening. The guide pin is connected to and interlocking with the first magnetic unit. The guide pin can be accommodated inside the housing or protruded outside the housing from opening. The display component includes a guided socket and a second magnetic unit. The guided socket and the second magnetic unit are located at same side of the display component. While the second magnetic unit of the display computing component approaches the opening, the first magnetic unit is attracted, to drive the guide pin to be protruded outside the housing, and connects with the guided socket.

17 Claims, 7 Drawing Sheets

(56) References Cited

U.S. PATENT DOCUMENTS

2013/0178161 A1* 7/2013 Shulenberger .......... G06F 1/162
                                                    455/41.2
2015/0261262 A1* 9/2015 Whitt, III .................. G06F 1/16
                                                    361/679.09

* cited by examiner

DETACHABLE PORTABLE COMPUTING APPARATUS

RELATED APPLICATIONS

This application claims priority to Chinese Application Serial Number 201510846714.9, filed Nov. 27, 2015, which is herein incorporated by reference.

BACKGROUND

Field of Invention

The present disclosure relates to a detachable portable computing apparatus. More particularly, the present disclosure relates to a connecting component of a detachable portable computing apparatus.

Description of Related Art

A detachable portable computing apparatus usually can be separated into several parts, such as a display computing component, and a base . . . etc. Regarding a detachable portable computing apparatus that can be separated into two parts, a display computing component and a base, as an example. Generally speaking, for the purpose of carrying the display computing component independently easier, and also taking easy assembling and disassembling with the base into consideration, the detachable portable computing apparatus may install compatible assembling features, such as a guide pin and a socket, on the base and the display computing component respectively. For example, a guide pin installed on the base is configured to be inserted into a socket inside the display computing component. Therefore, the compatible assembling features may enhance the coupling strength between the display computing component and the base, to prevent the display computing component separated from the base, and still can be disassembled through specific method.

However, the guide pin installed on the base is usually protruding from the base, which may result an unattractive appearance. Due to the coupling structures of the guide pin protruding outside the base, the guide pin may be easily bumped or hooked with others, while disassembling from the protective socket; moreover, the guide pin bumped or hooked with others may be ruined or permanent deformed under strong external force. Consequently, the available structure of a detachable portable computing apparatus, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a detachable portable computing apparatus includes a base, a connecting component and a display computing component. The connecting component includes a housing, a first magnetic unit, and a guide pin. The housing is pivotally-connected to the base. The housing has at least one opening on a side of the housing, and corresponding with the guide pin. The first magnetic unit is located inside the housing, and configured to move toward or away from the opening. The guide pin is connected to and interlocking with the first magnetic unit. The guide pin can be accommodated inside the housing or protruded outside the housing from opening. The display computing component includes a guided socket and a second magnetic unit. The guided socket and the second magnetic unit are located at same side of the display computing component. While the second magnetic unit of the display computing component approaches the opening, the second magnetic unit attracts the first magnetic unit to drive the guide pin, such that the guide pin is protruded outside the housing through the opening to engage with the guided socket.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
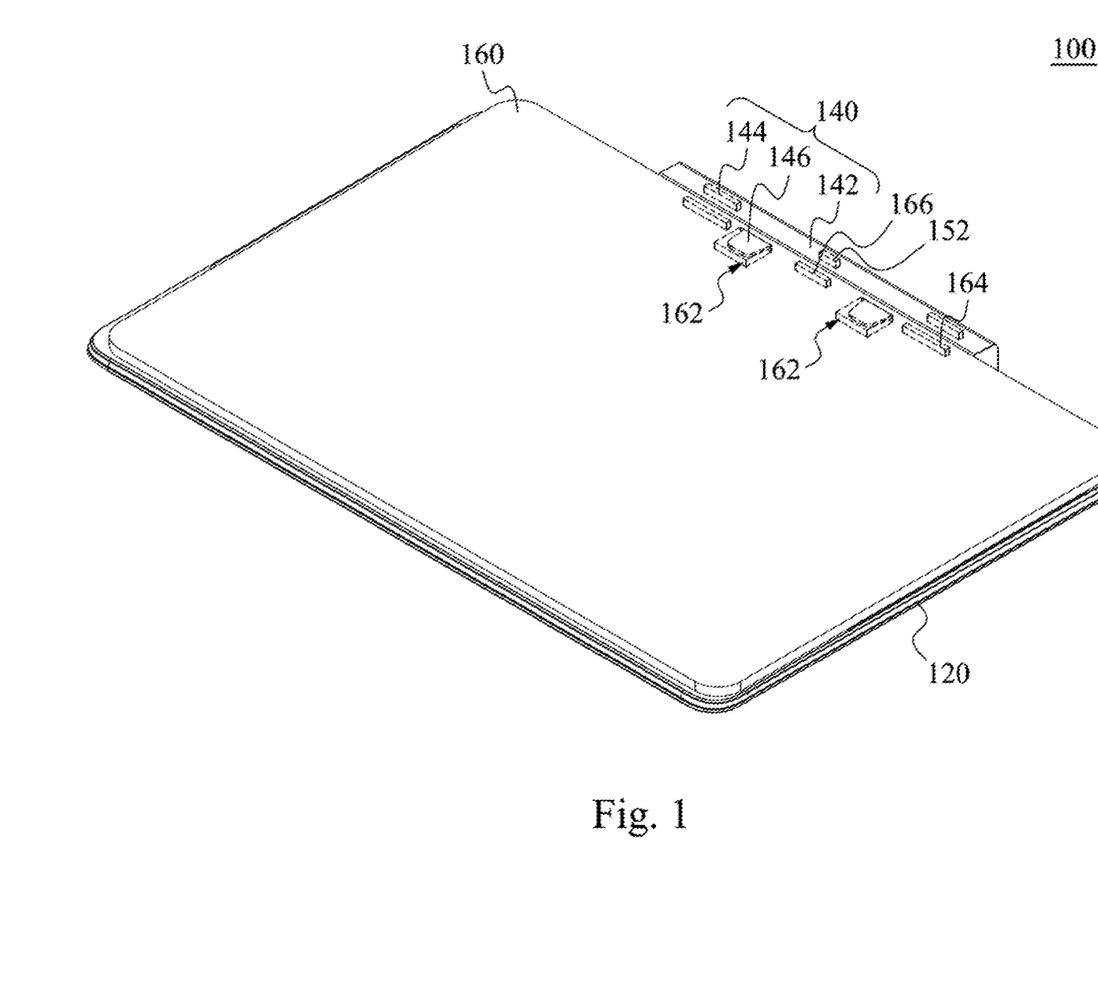
FIG. 1 is a three dimensional perspective view of a detachable portable computing apparatus according to an embodiment of the present disclosure.
Figure 2:
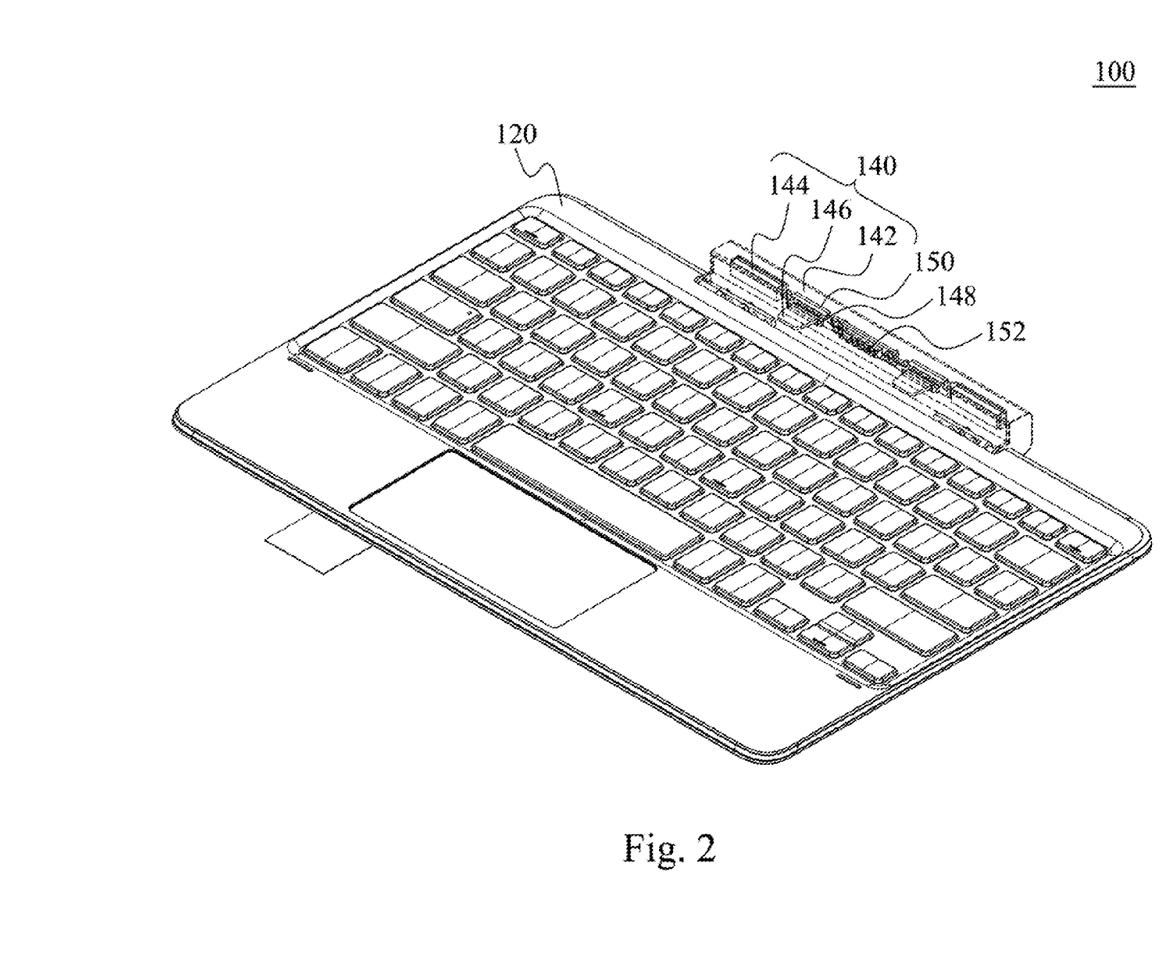
FIG. 2 is a three dimensional perspective view of a connecting component and a part of a base of a detachable portable computing apparatus, as shown in FIG. 1, according to an embodiment of the present disclosure.

FIG. 1 illustrates a three dimensional perspective view of a detachable portable computing apparatus 100 according to an embodiment of the present disclosure. FIG. 2 illustrates a three dimensional perspective view of a connecting component 140 and a part of a base 120 of a detachable portable computing apparatus 100, as shown in FIG. 1, in which a housing 142 is plotted in dotted line, according to an embodiment of the present disclosure. As shown in FIG. 1, the detachable portable computing apparatus 100 includes a base 120, a connecting component 140 and a display computing component 160. In some embodiments, the base 120 may include one or more input device, such as keyboard, touch sensing panel or other suitable controllable input device. In some embodiments, the display computing component 160 can be a portable computing apparatus, such as tablet personal computer (tablet PC), or other suitable portable computing apparatus.

Referring to FIG. 2, the connecting component 140 includes a housing 142, at least one first magnetic unit 144, and at least one guide pin 146. The housing 142 is pivotally-connected to the base. In some embodiments, the material of the housing 142 can be a high molecular polymer, metal without ferromagnetic properties, or other suitable material. The housing 142 has at least one opening 148 on a side of the housing 142, and corresponding with the guide pin 146. The first magnetic unit 144 is located inside the housing 142, and configured to move toward or away from the opening 148 (For example, using the inner wall to restrict a moving direction of the first magnetic unit 144). The guide pin 146 is connected to and interlocking with the first magnetic unit 144. The guide pin 146 can be accommodated inside the housing 142 or protruded outside the housing 142 through the opening 148. In some embodiments, the guide pin 146 may include a connecting rod 150, located inside the housing 142. The first magnetic unit 144 is connected to the guide pin 146 through the connecting rod 150, such that the first magnetic unit 144 may drive the guide pin 146 through the connecting rod 150. In some embodiments, the first magnetic unit 144 can be directly connected to the guide pin 146.

As shown in FIG. 1, the display computing component 160 includes at least one guided socket 162 (plotted in a dotted line) and a second magnetic unit 164 (plotted in a dotted line). The guided socket 162 and the second magnetic unit 164 are located at same side of the display computing component 160. While the second magnetic unit 164 of the display computing component 160 approaches the opening 148, the second magnetic unit 164 magnetically attracts the first magnetic unit 144, to drive or actuate the guide pin 146 interlocking with the first magnetic unit 144, such that the guide pin 146 can be protruded outside the housing 142 through the opening 148 to engage with the guided socket 162. While the display computing component 160 leaves the connecting component 140, the guide pin 146 can be dragged through gravitational force, electromagnetic force, or other suitable guiding method, to be fully or partially accommodated inside the housing 142, which may described in detail later.

It should be noted that, in some embodiments, the first magnetic unit 144 and the second magnetic unit 164 may both have permanent magnetic properties. In some embodiments, one of the first magnetic unit 144 and the second magnetic unit 164 has permanent magnetic properties, and another one may have temporary magnetic properties under electromagnetic induction. For example, in part of embodiments, both the first magnetic unit 144 and the second magnetic unit 164 have permanent magnetic properties, and connecting portions of the first magnetic unit 144 and the second magnetic unit 164 has opposite magnetic properties, so the first magnetic unit 144 can be magnetically connected to the second magnetic unit 164. For example, in part of embodiments, the second magnetic unit 164 has permanent magnetic properties, and the first magnetic unit 144 is made from material having temporary magnetic properties under electromagnetic induction, such as ferromagnetic material. Therefore, when the second magnetic unit 164 approaches the first magnetic unit 144, the first magnetic unit 144 can be electromagnetic inducted to possess temporary magnetic properties, and magnetically connected with the second magnetic unit 164. Furthermore, in the embodiments that only the second magnetic unit 164 possess permanent magnetic properties, owing to the first magnetic unit 144 with temporary magnetic properties can not be induced to generate repelling force against the second magnetic unit 164, the detachable portable computing apparatus 100 may have more flexibilities. On the other hand, in the embodiments that both the first magnetic unit 144 and the second magnetic unit 164 have permanent magnetic properties, owing to the first magnetic unit 144 and the second magnetic unit 164 may generate magnetically attracting force or repelling force, depend on the arrangement direction of the first magnetic unit 144 and the second magnetic unit 164, so as to restrict a connected direction of the connection component 140 and the display computing component 160.

That is to say, the second magnetic unit 164 can have permanent magnetic properties, and the first magnetic unit 144 may be optionally have permanent magnetic properties or temporary magnetic properties, such as ferromagnetic material. Therefore, while the second magnetic unit 164 is magnetically connected to the first magnetic unit 144, a connecting direction or method is not restricted to a certain exemplary, could be adjusted to actual demand by those skilled in the art without departed from the scope or the spirit of the present disclosure. The prerequisite of the connection relation between the first magnetic unit 144 and the second magnetic unit 164 is that, while the first magnetic unit 144 is approached close to the second magnetic unit 164 within a distance, the generated magnetic attracting force between the first magnetic unit 144 and the second magnetic unit 164 is greater enough to drive or actuate the guide pin 146 protruding outside the housing 142 through the opening 148.

Owing to the guide pin 146 can be dragged through gravitational force, electromagnetic force, or other suitable guiding method, to be at least partially accommodated inside the housing 142, while the display computing component 160 leaves the connecting component 140. The guide pin 146 of the connecting component 140 in the detachable portable computing apparatus 100 may reduce probabilities of or avoid the guide pin 146 being bumped or hooked with others comparing to other fixed designed guide pin, while the display computing component 160 departed from the connecting component 140 or the base 120. Besides, the guide pin 146, at least partially accommodated inside the housing 142, may result a better appearance without feature protruding from the base 120. However, the longest length of the guide pin 146, which can be accommodated by the housing 142, is depend on some parameters of the housing 142, such as distance between the sidewall of the housing 142. In some embodiments, the guide pin 146 can be fully accommodated inside the housing 142, in which the guide pin 146 would not be protruded outside the housing 142.

In some embodiments, the display computing component 160 may further include a first transmit/receive module 166 (as shown in FIG. 1 depicted in a dotted line). The connecting component 140 may further include a second transmit/receive module 152. The second transmit/receive module 152 can be electrically connected to a circuit board (not shown) inside the base 120. While the display computing component 160 is connected to the connecting component 140, the first transmit/receive module 166 is electrically connected to the second transmit/receive module 152. In some embodiments, while the display computing component 160 is abutted against the housing 142, the first transmit/receive module 166 is connected to the second transmit/receive module 152. In some embodiments, the second transmit/receive module 152 may have a varied length to keep electrically connected with the first transmit/receive module 166. The varied length of the second transmit/receive module 152 may be prolonged or shorten depend on a distance between the first transmit/receive module 166 and the second transmit/receive module 152, for example, the second transmit/receive module 152 can have a structure like Pogo pin, or other suitable structure.

Figure 3:
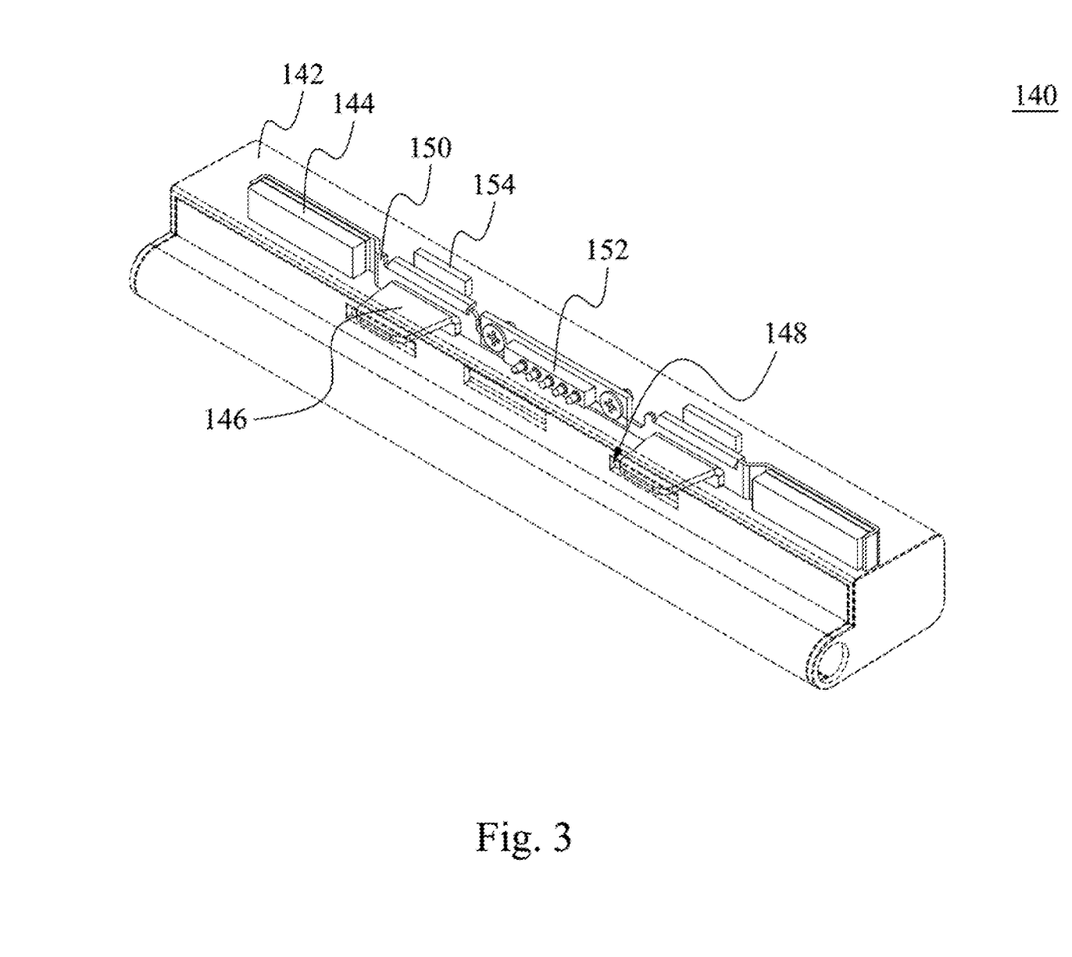
FIG. 3 is a three dimensional perspective view of a detachable portable computing apparatus, while the guide pin is accommodated inside a housing, according to an embodiment of the present disclosure.
Figure 4:
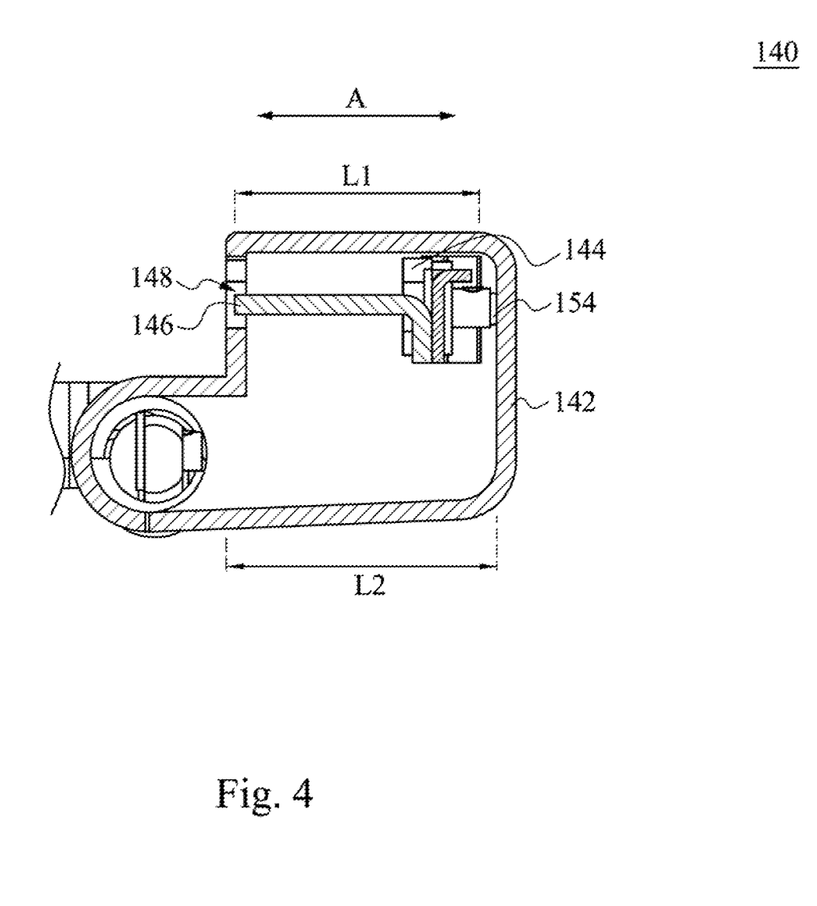
FIG. 4 is a longitudinal sectional view of a detachable portable computing apparatus, while the guide pin is accommodated inside a housing, according to an embodiment of the present disclosure.

FIG. 3 illustrates a three dimensional perspective view of a detachable portable computing apparatus 100, while the guide pin 146 is accommodated inside a housing 142, in which a housing 142 is plotted in dotted line, according to an embodiment of the present disclosure. FIG. 4 illustrates a longitudinal sectional view of a detachable portable computing apparatus 100, while the guide pin 146 is accommodated inside a housing 142, according to an embodiment of the present disclosure. As shown in FIG. 3 and FIG. 4, in some embodiments, the connecting component 140 may further include restoring unit 154, disposed inside the housing 142. The restoring unit 154 is configured to drive the first magnetic unit 144 and the guide pin 146 moving away from the opening 148, and force the guide pin 146 being accommodated inside the housing 142. In some embodiments, the restoring unit 154 can be magnet, spring or other suitable mechanical structure to help the guide pin 146 restoring position after the display computing component 160 departed from the guide pin 146.

Referring to FIG. 4, in some embodiments, the guide pin 146 is magnetically attracted by the restoring unit 154. Furthermore, in some embodiments, an end of the guide pin 146 closed to the opening 148 wouldn't posses any magnetic properties, to avoid influence on departed of the display computing component 160, but an end of the guide pin 146 away from the opening 148 may have portion possessed magnetic properties. For example, the connecting rod 150 may be formed by material with magnetic properties, such as ferromagnetic material. The restoring unit may attract a portion of the guide pin 146 with magnetic properties. Therefore, while the display computing component 160 departed from the guide pin 146, the guide pin 146 can be fast restored to a position, that the guide pin 146 is at least accommodated inside the housing 142. Automatically accommodating the guide pin 146, after the display computing component 160 departed from the guide pin 146, may reduce probabilities of or avoid the guide pin 146 being bumped or hooked with others, and result a better appearance without feature protruding from the base 120.

In part of embodiments, the guide pin 146 has a guide-pin length L1 along an extension direction A of the guide pin 146. The housing 142 has a housing length L2, measured from a surface of the opening 148 to a surface of the housing 142 facing away from the opening 148 along a direction substantially parallel to the extension direction A. In some embodiments, the housing length L2 is greater than the guide-pin length L1. Therefore, the guide pin 146 may be fully accommodated inside the housing 142, for a better protective performance.

Figure 5:
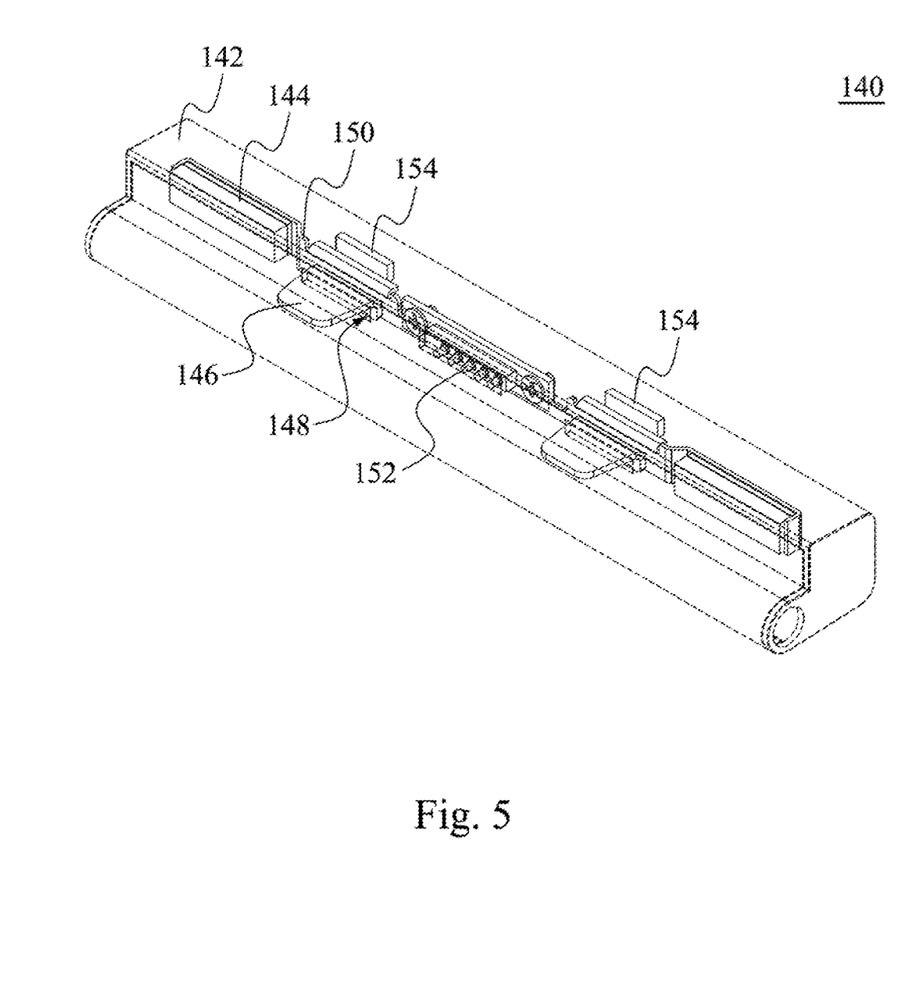
FIG. 5 is a three dimensional perspective view of a detachable portable computing apparatus, while the guide pin is protruded outside a housing, according to an embodiment of the present disclosure.
Figure 6:
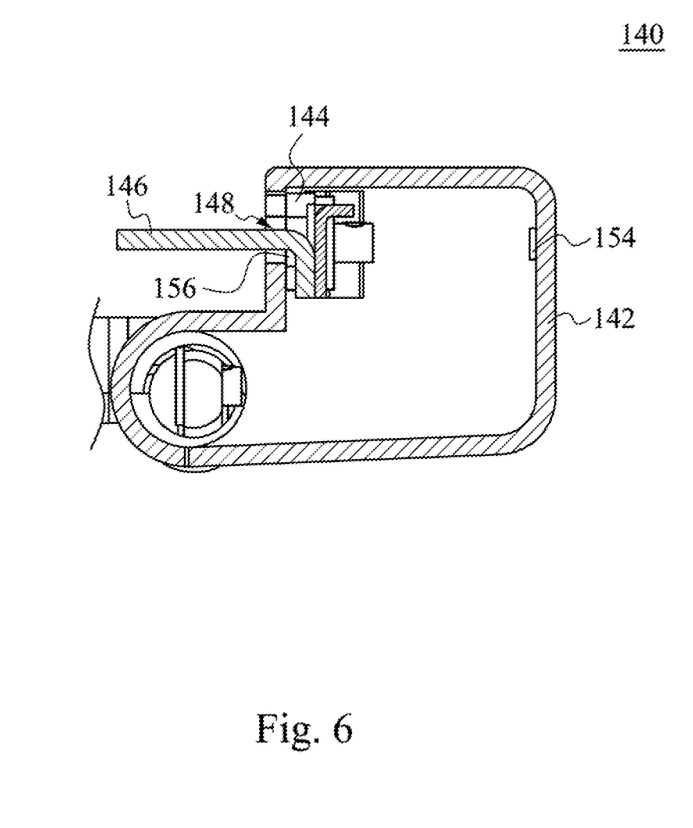
FIG. 6 is a longitudinal sectional view of a detachable portable computing apparatus, while the guide pin is protruded outside a housing, according to an embodiment of the present disclosure.

FIG. 5 illustrates a three dimensional perspective view of a detachable portable computing apparatus 100, while the guide pin 146 is protruded outside a housing 142, in which a housing 142 is plotted in dotted line, according to an embodiment of the present disclosure. FIG. 6 is a longitudinal sectional view of a detachable portable computing apparatus 100, while the guide pin 146 is protruded outside a housing 142, according to an embodiment of the present disclosure. In some embodiments, while the second magnetic unit 164 of the display computing component 160 approaches the opening 148, and the second magnetic unit 164 attracts the first magnetic unit 144, an applied force between the first magnetic unit 144 and the second magnetic unit 164 is greater than an applied force between the restoring unit and the guide pin 146. Therefore, when the display computing component 160 is intended to install on the connecting portion 140, the guide pin 146 may be drove or actuated by the first magnetic unit, moving toward the opening 148, till the guide pin 146 protruding outside the opening 148. The guide pin 146 protruding outside the opening 148 may be connected or coupled to the guiding socket 162. In some embodiments, the guide pin 146 may further include a stopper portion 156 (as shown in FIG. 6). While the guide pin 146 drove or actuated by the first magnetic unit, moves toward the opening 148, the stopper portion 156 may abut against the side of the housing 142 having the opening 148, to stop guide pin 146 moving.

In some embodiment, the second transmit/receive module 150 is connected to the connecting rod 150, and interlocking with the first magnetic unit 144 and the guide pin 146. The housing 142 has the openings 148, one of the openings 148 is corresponded with the second transmit/receive module 150. While the guide pin 146 is protruding outside the housing 142 through the rest of the openings 148, the second transmit/receive module 150 is protruding outside the housing 142 through the corresponded opening 148. In some embodiments, the housing may have a single opening 148, and the guide pin 146 and the second transmit/receive module 150 may be protruding outside the housing 142 through the opening 148 together (not shown). In some embodiments, the first transmit/receive module 166 is connected to the second transmit/receive module 150 through the corresponded opening 148.

As shown in FIG. 5, in some embodiments, the connecting component 140 includes two first magnetic units 144 and two guide pins 146. In some embodiments, the two guide pins 146 are located between the two first magnetic units 144. In some embodiments, the second transmit/receive module 150 is located between the two guide pins 146.

Figure 7:
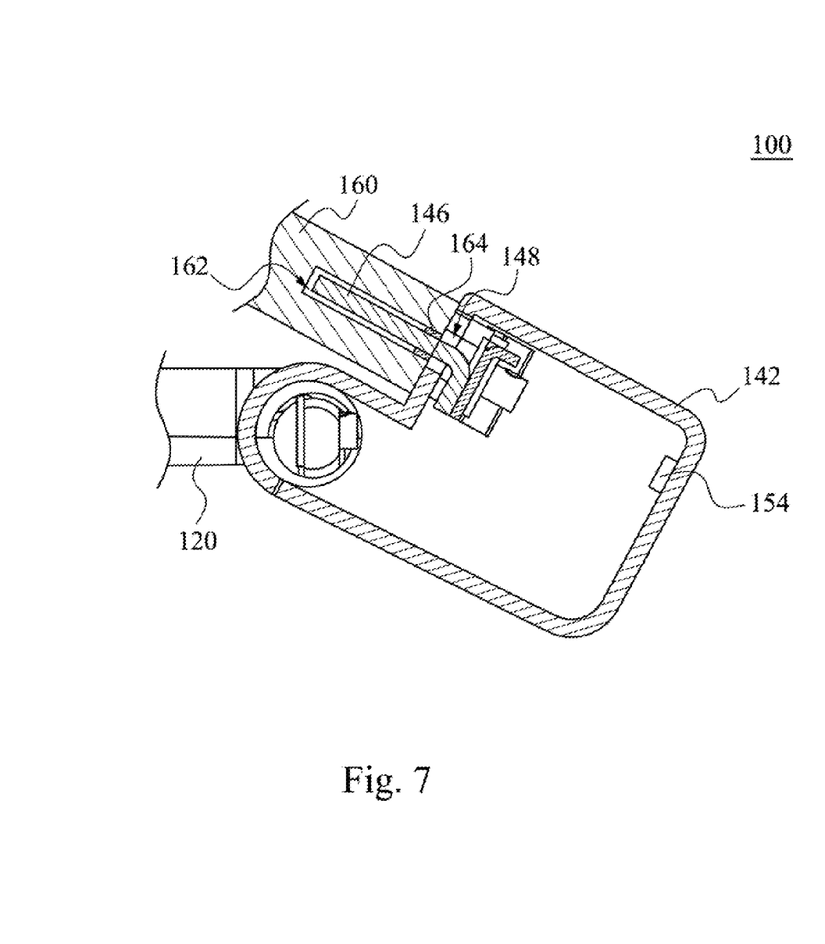
FIG. 7 is a longitudinal sectional view of a detachable portable computing apparatus according to an embodiment of the present disclosure.

FIG. 7 is a longitudinal sectional view of a detachable portable computing apparatus 100 according to an embodiment of the present disclosure. In some embodiments, when the display computing component 160 is installed on the connecting portion 140, the guide pin 146 drove or actuated by the first magnetic unit, moves toward the opening 148, to the guide pin 146 protruding outside the opening 148 and connect to the guiding socket 162. Therefore the display computing component 160 may rotate relative to the base 120 through connecting to the connecting component 140, and the combination of the guide pin 146 and the guiding socket 162 with the combination of the first magnetic units 144 and the second magnetic units 164, may help to fix the display computing component 160 onto the connecting portion 140, and provide force to support the display computing component 160, in which an angle between the display computing component 160 and the base 120 can be arbitrary within a restricted range.

Figure 8:
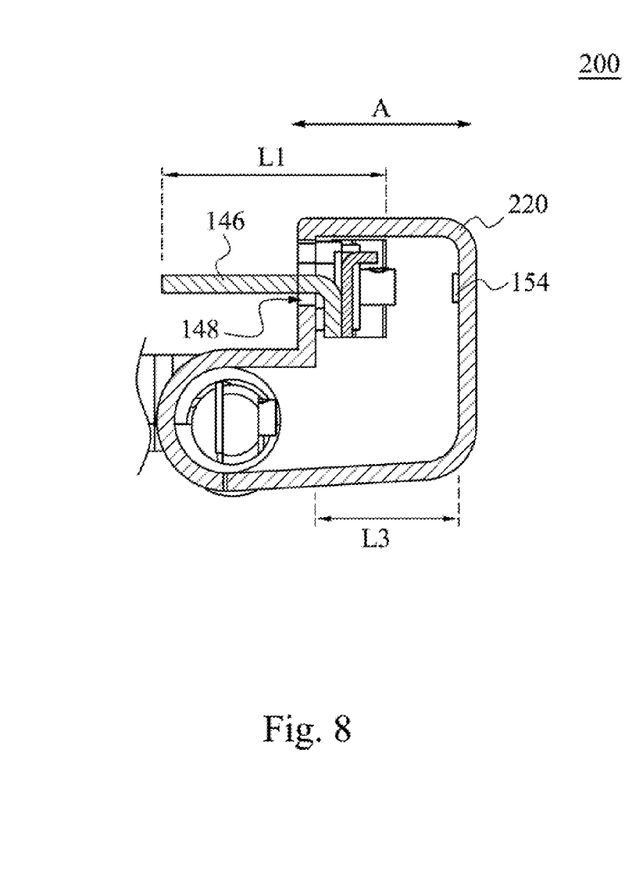
FIG. 8 is a longitudinal sectional view of a detachable portable computing apparatus, while the guide pin is accommodated inside a housing, according to another embodiment of the present disclosure.

FIG. 8 is a longitudinal sectional view of a detachable portable computing apparatus 200, while the guide pin 146 is accommodated inside a housing 220, according to another embodiment of the present disclosure. In part of embodiments, the guide pin 146 has a guide-pin length L1 along an extension direction A of the guide pin 146. The housing 220 has a housing length L3, measured from a surface of the opening 148 to a surface of the housing 220 facing away from the opening 148 along a direction substantially parallel to the extension direction A. In some embodiments, the housing length L3 is lesser than the guide-pin length L1. Therefore, the guide pin 146 may be partially accommodated inside the housing 220, a part of the guide pin 146 is protruding outside the opening 148. Although the embodiments, described herein, may not provide full protection for the guide pin 146, but the housing 220 of the detachable portable computing apparatus 200 can prevent the housing 220 being too long to influence rotation of the connecting component 140. Besides, the guide pin 146 partially accommodated inside the housing 220 still be protected by the housing 220, and the guide pin 146 can be disappear while viewing parallel to the base, if the connecting component 140 rotated some predetermined angle.

It should be understood, the housing 142 and the housing 220, described herein, is only an exemplary, and not intended to limit the present disclosure. Aspect of t he housing 142 and the housing 220, could be adjusted to actual demand by those skilled in the art, without departed from the scope or the spirits of the present disclosure. That is to say, prerequisite of the housing 142 and the housing 220 is to hidden the guide pin 146 to be less obvious or protruding for appearance, while the display computing component 160 departed from the connecting component 140.

Summarized from the above, the present disclosure provides a detachable portable computing apparatus includes a base, a connecting component and a display computing component. The connecting component includes a housing, a first magnetic unit, and a guide pin. The housing is pivotally-connected to the base. The housing has at least one opening on a side of the housing, and corresponding with the guide pin. The first magnetic unit is located inside the housing, and configured to move toward or away from the opening. The guide pin is connected to and interlocking with the first magnetic unit. The guide pin can be accommodated inside the housing or protruded outside the housing from opening. The display computing component includes a guided socket and a second magnetic unit. The guided socket and the second magnetic unit are located at same side of the display computing component. While the second magnetic unit of the display computing component approaches the opening, the second magnetic unit attracts the first magnetic unit to drive the guide pin, such that the guide pin is protruded outside the housing through the opening to engage with the guided socket.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A detachable portable computing apparatus, comprising a base;
a connecting component, comprising:
   a housing, having at least one opening on a side of the housing;
   at least one first magnetic unit, located inside the housing, and the first magnetic unit is configured to move toward or away from the opening; and
   a guide pin, connected to and interlocking with the first magnetic unit, the guide pin is configured to be accommodated inside the housing or protruded outside the housing from the opening; and
a display computing component, comprising:
   at least one guiding socket, located at a side of he display computing component; and
   at least second magnetic unit, disposed at the side of the display computing component,
wherein when the second magnetic unit of the display computing component approaches the opening, the second magnetic unit attracts the first magnetic unit to drive the guide pin, so that the guide pin is protruded outside the housing through the opening to engage with the guiding socket.

2. The detachable portable computing apparatus of claim 1, wherein the connecting component further comprises at least one restoring unit, disposed inside the housing, the restoring unit is configured to drive the first magnetic unit and the guide pin moving away from the opening, and force the guide pin being accommodated inside the housing.

3. The detachable portable computing apparatus of claim 2, wherein the guide pin is magnetically attracted by the restoring unit.

4. The detachable portable computing apparatus of claim 2, wherein when the second magnetic unit of the display computing component approaches the opening, and attracts the first magnetic unit, an applied force between the first magnetic unit and the second magnetic unit is greater than an applied force between the restoring unit and the guide pin.

5. The detachable portable computing apparatus of claim 1, wherein the housing is pivotally-connected to the base.

6. The detachable portable computing apparatus of claim 1, wherein the guide pin comprises a stopper portion, configured to abut against the side of the housing having the opening.

7. The detachable portable computing apparatus of claim 1, wherein the display computing component further comprises a first transmit/receive module, the connecting component further comprises a second transmit/receive module, wherein when the display computing component is connected to the connecting component, the first transmit/receive module is connected to the second transmit/receive module.

8. The detachable portable computing apparatus of claim 7, wherein the second transmit/receive module is electrically connected to the base.

9. The detachable portable computing apparatus of claim 7, wherein when the display computing component is abutted against the housing, the first transmit/receive module is connected to the second transmit/receive module.

10. The detachable portable computing apparatus of claim 7, wherein the second transmit/receive module is connected to and interlocking with the first magnetic unit.

11. The detachable portable computing apparatus of claim 10, wherein the housing has a plurality of the openings, one of the openings is corresponded with the second transmit/receive module, wherein when the guide pin is protruding outside the housing through the rest of the openings, the first transmit/receive module is connected to the second transmit/receive module through the corresponded opening.

12. The detachable portable computing apparatus of claim 11, wherein when the guide pin is protruding outside the housing through the rest of the openings, the second transmit/receive module is protruding outside the housing through the corresponded opening.

13. The detachable portable computing apparatus of claim 1, wherein the connecting component comprises two first magnetic units and two guide pins.

14. The detachable portable computing apparatus of claim 13, wherein the two guide pins are located between the two first magnetic units.

15. The detachable portable computing apparatus of claim 1, wherein the guide pin has a guide-pin length along an extension direction of the guide pin, the housing has a housing length, measured from a surface of the opening to a surface of the housing facing away from the opening along the extension direction, the housing length is greater than the guide-pin length.

16. The detachable portable computing apparatus of claim 1, wherein the guide pin is fully accommodated inside the housing.

17. The detachable portable computing apparatus of claim 1, wherein while the guide pin accommodated inside the housing, a part of the guide pin is protruding outside the opening.

* * * * *